(No Model.)
C. R. WILSON & G. M. CHALFANT.
CORNER IRON FOR VEHICLE BODIES.
No. 327,045. Patented Sept. 29, 1885.
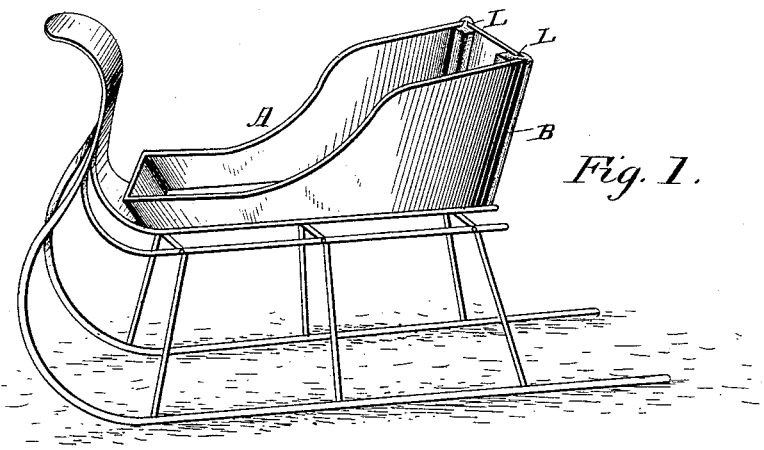
Fig. 1.
Fig. 2.
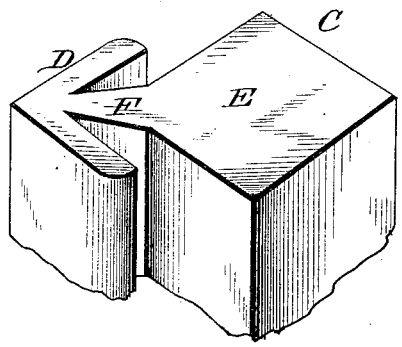
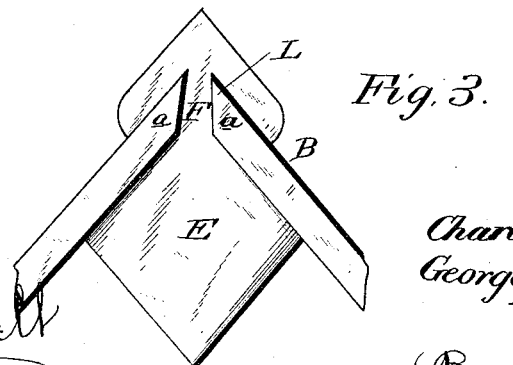
Fig. 3.
Charles R. Wilson.
George M. Chalfant.
INVENTORS.
WITNESSES
By C. A. Snow & Co.
Attorneys

UNITED STATES PATENT OFFICE.

CHARLES R. WILSON AND GEORGE M. CHALFANT, OF DETROIT, MICHIGAN, ASSIGNORS TO C. R. & J. C. WILSON, OF SAME PLACE.

CORNER-IRON FOR VEHICLE-BODIES.

SPECIFICATION forming part of Letters Patent No. 327,045, dated September 29, 1885.

Application filed June 28, 1884. (No model.)

*To all whom it may concern:*

Be it known that we, CHARLES R. WILSON and GEORGE M. CHALFANT, citizens of the United States, residing at Detroit, in the county of Wayne and State of Michigan, have invented a new and useful Combined Corner and Molding for Sleighs and other Vehicles, of which the following is a specification, reference being had to the accompanying drawings.

This invention relates to a combined corner and molding for vehicle and sleigh bodies; and it has for its object to provide a device of this character which will be simple in construction, convenient in its application, inexpensive to manufacture, and which will entirely obviate the annoyance of the corners opening by exposure and constant use.

Heretofore the rear corners of cutters were made by gluing the panels onto the outside of a corner-block, bringing the ends of the panels together at the corner of the block, and then gluing the corner-molding onto the outside of the panels. With this manner of construction the corners invariably open by exposure and the constant strain they are subjected to when in use. We obviate these objections by forming the molding and corner-block in one piece, as shown; and to this end the said invention consists in certain details of construction and combination of parts, as hereinafter set forth, and particularly pointed out in the claim.

In the accompanying drawings, Figure 1 is a perspective view of a sleigh with our improved corner-block and molding attached thereto. Fig. 2 is a detail perspective view of the combined corner-block and molding. Fig. 3 is a plan view of a portion of the vehicle-body with our improvement applied to the corner thereof.

Like letters refer to corresponding parts in the several figures.

Referring to the drawings, A designates the wagon or sleigh body, to the corners B of which our improvement is applied, the ends and sides of the body, where they come together at the corner B, being slotted or cut away at L, and mitered or beveled off, as at *a*.

C designates our improvement, which consists of the molding D and corner-block E, formed in one piece and connected by a tapering neck, F, the latter being smaller at the outer end where it connects with the molding, so as to receive the pointed ends and sides of the body.

The operation of our invention will be readily understood from the foregoing description, taken in connection with the annexed drawings. The ends and sides of the body at the corner B are cut away at L to leave a space for the reception of the neck F, and are beveled off, as at *a*, so as to correspond with the tapering construction of said neck. The device is then inserted in place by causing the neck to enter the slotted portion L at the corner B, and then driving the neck down into position, the molding fitting around the sides and ends of the body, and serving to hold the beveled ends *a* within the space between the molding and the neck. The corner-block E and molding in conjunction prevent the ends *a* from slipping out of place or from working loose, and effectually brace the corner, so as to securely hold the same tight.

It will be seen that the combined corner and molding will hold the rear corners of sleighs and other vehicles together, and prevent the same from opening by exposure and the strains to which they are subjected while in use.

The molding may be made of any suitable shape or configuration and ornamented upon its exterior, so as to present an attractive appearance, and the corner-block may also be made triangular or other shape, as found desirable.

Various other modifications may be made without departing from the spirit or scope of our invention.

The combined corner and molding may be made of any suitable material; but we prefer to construct the same of wood, although we do not wish to be limited to the use of that material alone.

The improved corner and molding may be applied to seats of wagons and other vehicles, and may be used for any other purpose to which it could be adapted.

In defining the nature, scope, and advantages of the present invention we would have it understood that heretofore it has been proposed to construct corner-irons having somewhat the shape of our combined corner-block and molding, as will be seen by reference to Patents No. 164,703, granted to Acker and Robinson, and No. 245,162, granted to Hollenbeck. The constructions shown in these patents we hereby disclaim, since they form no part of our invention.

Having described our invention we claim—

The vehicle-body slotted vertically or provided with an open space at its corners, as shown, in combination with the molding fitting around and over the outer faces of the corners, the neck arranged within the slot or space, and the corner-block occupying the space between and bearing against the inner faces of the two meeting parts of the body at the corners, as set forth.

In testimony that we claim the foregoing as our own we have hereto affixed our signatures in presence of two witnesses.

CHARLES R. WILSON.
GEORGE M. CHALFANT.

Witnesses as to Wilson:
EDW. G. SIGGERS,
THEO. MUNGEN.

Witnesses as to Chalfant:
GEO. W. BATES,
LUCIUS W. FRAZER.